United States Patent
Ready et al.

(10) Patent No.: US 10,613,709 B2
(45) Date of Patent: Apr. 7, 2020

(54) LEVERAGING AND MANAGING ASSESSMENT ENVIRONMENTS IN AN ASSESSMENT HUB

(71) Applicant: salesforce.com, inc., San Francisco, CA (US)

(72) Inventors: Samantha Ready, San Francisco, CA (US); Douglas Bitting, Pleasanton, CA (US); Martin Meyer, Oakland, CA (US); Ashish Upadhyay, San Francisco, CA (US); Adam Purkiss, San Francisco, CA (US); Tyler Montgomery, Lodi, CA (US)

(73) Assignee: salesforce.com, inc., San Francisco, CA (US)

( * ) Notice: Subject to any disclaimer, the term of this patent is extended or adjusted under 35 U.S.C. 154(b) by 196 days.

(21) Appl. No.: 15/592,987

(22) Filed: May 11, 2017

(65) Prior Publication Data
US 2018/0095613 A1  Apr. 5, 2018

Related U.S. Application Data

(60) Provisional application No. 62/402,138, filed on Sep. 30, 2016.

(51) Int. Cl.
| | | |
|---|---|---|
| *G06F 3/0482* | (2013.01) | |
| *G06F 16/958* | (2019.01) | |
| *H04L 29/06* | (2006.01) | |
| *H04L 29/08* | (2006.01) | |

(52) U.S. Cl.
CPC .......... *G06F 3/0482* (2013.01); *G06F 16/958* (2019.01); *H04L 63/083* (2013.01); *H04L 67/02* (2013.01); *H04L 67/1097* (2013.01)

(58) Field of Classification Search
CPC ............................. G06F 3/04842; G06F 21/31
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

OTHER PUBLICATIONS

U.S. Appl. No. 15/455,433, filed Mar. 10, 2017, Bitting, et al.

(Continued)

*Primary Examiner* — Rayeez R Chowdhury
(74) *Attorney, Agent, or Firm* — Weaver Austin Villeneuve & Sampson LLP

(57) ABSTRACT

Disclosed are some implementations of systems, apparatus, methods and computer program products for facilitating the management of assessment environments in an eLearning environment. A user may switch between assessment environments by selecting from a menu of selectable assessment environments. Educational content may be presented within a context of a selected assessment environment and assessment tasks may be completed within the context of the selected assessment environment.

20 Claims, 12 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,973,106 B2 | 3/2015 | Warshaysky et al. |
| 9,628,493 B2 | 4/2017 | Warshaysky et al. |
| 9,647,922 B2 | 5/2017 | Mortimore, Jr. et al. |
| 10,223,136 B2 | 3/2019 | Torman et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2008/0254431 A1* | 10/2008 | Woolf ............... G09B 5/00 434/322 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0055100 A1* | 3/2011 | Perreault ............ G06Q 10/10 705/327 |
| 2011/0218958 A1 | 9/2011 | Warshaysky et al. |
| 2011/0247051 A1 | 10/2011 | Bulumulla et al. |
| 2011/0277027 A1* | 11/2011 | Hayton ............ H04L 63/0815 726/8 |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0298202 A1* | 11/2013 | Warshavsky ......... H04L 63/10 726/4 |
| 2014/0006106 A1* | 1/2014 | Malov ............... G06Q 30/0204 705/7.33 |
| 2014/0006441 A1 | 1/2014 | Torman et al. |
| 2014/0359537 A1 | 12/2014 | Jakobson et al. |
| 2014/0365286 A1* | 12/2014 | Samoville .......... G06Q 30/0249 705/14.23 |
| 2014/0365900 A1* | 12/2014 | Chu ................... G06F 16/9554 715/738 |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0161282 A1* | 6/2015 | Low ................... G06F 16/9566 709/203 |
| 2015/0163206 A1* | 6/2015 | McCarthy .......... G06F 21/6227 713/171 |
| 2015/0172563 A1 | 6/2015 | Jakobson et al. |
| 2018/0095733 A1 | 4/2018 | Torman et al. |
| 2018/0096020 A1 | 4/2018 | Sreenivasa et al. |
| 2018/0096024 A1 | 4/2018 | Bitting et al. |
| 2018/0096613 A1 | 4/2018 | Torman et al. |

OTHER PUBLICATIONS

U.S. Appl. No. 15/455,452, filed Mar. 10, 2017, Sreenivasa, et al.
U.S. Appl. No. 15/479,729, filed Apr. 5, 2017, Torman, et al.
U.S. Appl. No. 15/487,874, filed Apr. 14, 2017, Torman, et al.
"Google Plus Users", Google+Ripples, Oct. 31, 2011 [retrieved on Feb. 21, 2012 from Internet at http://www.googleplusers.com/google-ripples.html], 3 pages.

* cited by examiner

LEVERAGING AND MANAGING ASSESSMENT ENVIRONMENTS IN AN ASSESSMENT HUB

PRIORITY DATA

This patent document claims priority to commonly assigned U.S. Provisional Patent Application No. 62/402,138, titled "Leveraging and Managing Assessment Environments in an Assessment Hub," by Ready et al., filed on Sep. 30, 2016, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, email systems, and instant messaging systems, by way of example, in a cloud computing environment.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

DETAILED DESCRIPTION

Figure 1:
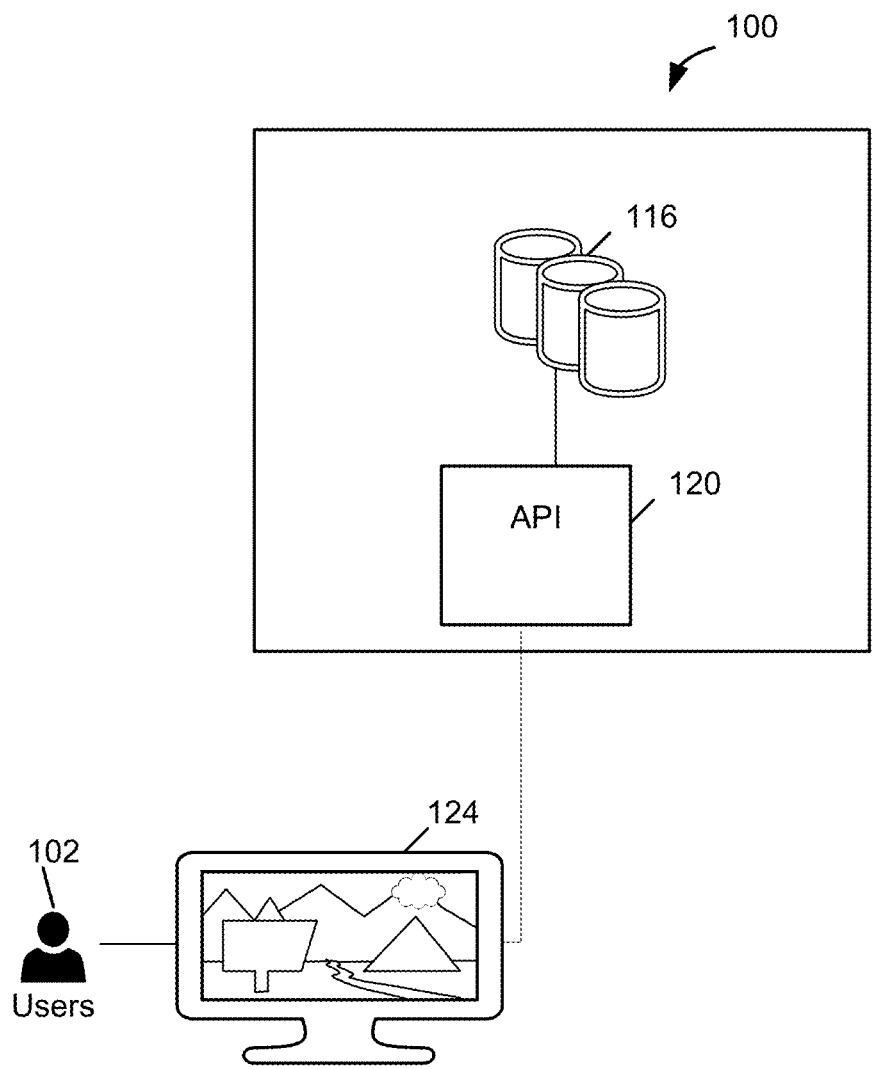
FIG. 1 shows a system diagram of an example of a database system 100 for assessment environment management in an eLearning environment, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for leveraging and managing assessment environments in an assessment hub. In some implementations, techniques are disclosed for validating hands-on assessments via a modular and extensible Application Programming Interface (API) assessment hub, an organization management interface, and a switcher for navigating among disparate environments in which a user can work.

In some implementations, an extensible service is provided to connect to external platforms via the API to assess an action in environments of the external platforms, and to facilitate an end user navigating among different environments while tracking all progress of the user in any of the environments to a single eLearning account.

In some implementations, an API assessment hub provides a modular test harness to use various APIs to validate hands-on assessments in an eLearning context. The API assessment hub has an architecture that enables customers, partners, and internal employees of an organization to build extensions to use the harness against any endpoint at any domain in the cloud. The API assessment hub can facilitate connections for different types of assessments such as programmatic/technical, simulations, fill in the blank, peer review, mix and match, etc. The API assessment hub can provide an extensible service to connect to other platforms via the API in order assess an action in the environments of the other platforms. The API assessment hub can also be configured to validate hands-on work completed via various APIs to assess skills competencies.

In some implementations, an organization (Org) management unit provides an architecture to facilitate association of different development environment identities with an end user. The Org management unit can provide both an identity to log onto the platform with and a mechanism for authorizing use for directly logging into and checking against the Org for hands-on assessments. By storing a refresh token for the Org, the user can be automatically authenticated into the Org through a declarative dropdown interface, by way of illustration. Once authorized, an access token may be obtained, and progress can be continually validated using the API assessment hub. A user can leverage his or her development environments to assess skills learned via an eLearning platform.

In some implementations, with a declarative org switcher interface, an end user can switch between development environments to build solutions for challenges/assessments in completely different environments and validate against those identities. Completion activity can be tracked using the same primary eLearning user account.

In some implementations, an Org switcher provides an interface for selecting an environment to complete hands-on assessments in and validate against using the API assessment hub. The Org switcher can provide a declarative dropdown interface for: switching to and launching any of a user's development environments, signing into another development environment and saving the environment for later access, and declaratively spinning up a new environment, which can be automatically saved to an environments table. The Org switcher can provide a default functionality to launch the last environment used when a "Launch" button is pressed.

By way of illustration, John is an employee at an organization, Pyramid Construction, Inc. John accesses an eLearning platform, which enables employees of the organization to complete learning assessment tasks within the context of their organization. An assessment environment corresponding to the organization has an associated database that reflects the data records that an employee of the organization would typically encounter during their day-to-day tasks. John logs in to the assessment environment, and John's credentials are saved in association with the assessment environment. As John completes various learning assessment tasks, his knowledge is assessed based upon the accuracy with which the tasks are completed.

To perform learning assessment tasks, a user must typically log in to an assessment environment using his or her credentials. If the user wishes to switch to a different assessment environment, the user must typically log out of the previous assessment environment and log in to the desired assessment environment. Moreover, if a user wishes to generate a new assessment environment, he or she must typically submit all information that will be used to generate the new assessment environment. Therefore, while an eLearning system can be a valuable resource, management of assessment environments that are used to facilitate eLearning can be time-consuming and tedious.

In accordance with various implementations, assessment environments are user-selectable from a menu of options. John declaratively selects an assessment environment from the menu. Since the system has previously authenticated John in association with the assessment environment, the system automatically logs John in to the selected assessment environment. John then proceeds with completing eLearning tasks that are presented to him within the context of the selected assessment environment. In addition, John may request that the system automatically generate a new assessment environment that is subsequently added to the menu of options. John switches between assessment environments without re-submitting his credentials, enabling him to complete eLearning assessment tasks in an efficient manner.

FIG. 1 shows a system diagram of an example of a database system 100 for assessment environment management in an eLearning environment, in accordance with some implementations. Database system 100 includes a variety of different hardware and/or software components that are in communication with each other. In the non-limiting example of FIG. 1, database system 100 includes at least one content service database 116, at least one assessment environment management API 120, and an enterprise learning platform 124. In accordance with various implementations, users may access enterprise learning platform 124 to learn about a corresponding web site and its associated services. More particularly, users may access enterprise learning platform 124 to perform hands-on assessment tasks within the context of an organization with which they are familiar. Assessment tasks may include, for example, writing a segment of computer code, modifying data within a data record, or generating a new data record. An assessment environment corresponding to the organization may have an associated database that replicates data maintained by the organization, as well as the hierarchical structure of the data maintained by the organization. For example, data associated with an insurance company may include customer data, account data, and insurance plan data.

In the following description, assessment tasks may also be referred to as challenges. In some implementations, the assessment tasks are presented in the form of learning paths within the context of a game. Learning paths may be organized in chronological order in which they are to be completed by users. Upon successful completion of an assessment task, the user may be presented a corresponding message via a display of their device. In addition, the user may be awarded points that signify the successful completion of the corresponding learning path.

Users 102 can include different users corresponding to a variety of roles and/or permissions. Examples of users include business users, technical users, content generator users, and learning users. In some implementations, release management can include releasing new educational content to enterprise learning platform 124. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

Communication among components of database system 100 may be facilitated through a combination of networks and interfaces. Database system 100 may handle and process data requests from users 102 of database system 100. For example, content validators and release managers can make changes to one or more release objects and have those changes stored in content database 116 or a separate production database. In some implementations, release objects allow users to modify educational content, add educational content, edit and/or update educational content, update the version of a release object, and preview educational content.

In other implementations, global namespacing is provided for granular security of educational content. An authorization service may be used to determine who can build, preview, or publish content. Multiple modes of access to production content can exist, which can be based on private authorization or public authorization. In still other implementations, a secure image service can be used to protect intellectual property, e.g., images and other media. Also or alternatively, a caching layer can be used for quick access to content, and APIs 120 can be used to release content systematically. In some implementations, access to APIs 120 can be restricted to an appropriate set of users. Similarly, the ability to generate or update release objects using APIs 120 can be restricted.

In some implementations, a user of enterprise learning platform 124 may have a single authorization identity. In other implementations, a user of enterprise learning platform 124 may have two or more different authorization identities. This can allow multiple modes of access to educational content, which can be based on private authorization or public authorization. For example, one authorization identity can be a set of access credentials based on a profile of a customer relationship management (CRM) computing platform. The other authorization identity can be a set of access credentials associated with enterprise learning platform 124. In some implementations, enterprise learning platform 124 can query the set of access credentials from the CRM computing platform and map those credentials and/or permissions with credentials associated with enterprise learning platform 124.

Figure 2A:
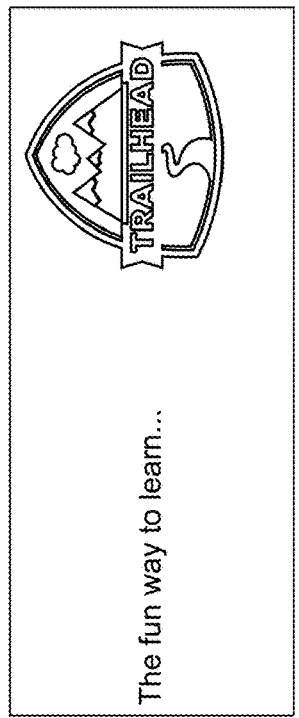
FIG. 2A shows an example of a user interface 200a in the form of a graphical user interface (GUI) as displayed on a computing device presenting educational content, in accordance with some implementations.
Figure 2A:
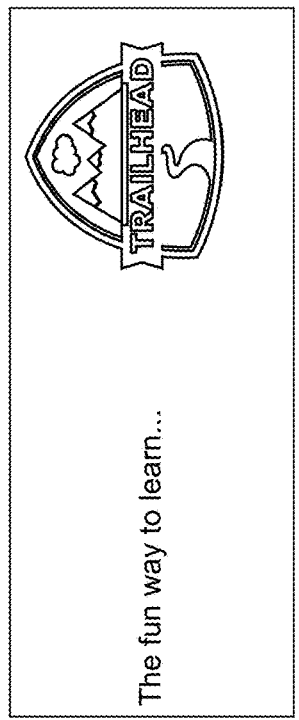
Figure 2B:
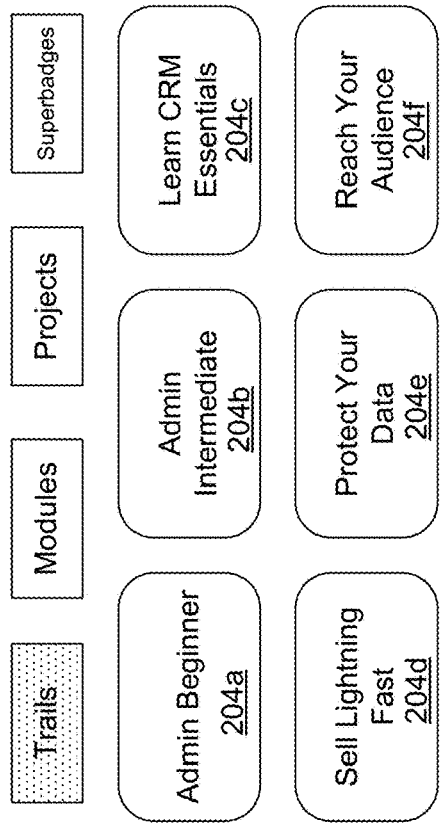
FIG. 2B shows an example of an updated user interface 200b in the form of a GUI as displayed on a computing device presenting educational content, in accordance with some implementations.

FIG. 2A shows an example of a user interface 200a in the form of a graphical user interface GUI as displayed on a computing device presenting educational content, in accordance with some implementations. User interface 200a shows educational content objects 204a-204f prior to a new release object being processed. FIG. 2B shows an example of an updated user interface 200b in the form of a GUI as displayed on a computing device presenting educational content, in accordance with some implementations. User interface 200b shows content objects 204a-204f after a new release object has been processed. In this example, a user has provided a new content object 208, e.g., "New Trail." After the release object, including New Trail is generated, the user interface 200b of the user device may display a hyperlink to a preview presentation including content objects 204a-204f as well as new content object 208. To access an eLearning content module, the user may select one of the content objects 204a-204f from within the user interface.

Figure 3:
FIG. 3 shows a graphical user interface (GUI) 300 presenting components for accessing eLearning content within the context of an assessment environment, in accordance with some implementations.

FIG. 3 shows a graphical user interface (GUI) 300 presenting components for accessing eLearning content within the context of an assessment environment, in accordance with some implementations. To initiate an eLearning process, a user may select an assessment environment from a menu of selectable options. In this example, the user has selected the Trailhead Edition 302. The user is then presented various assessment tasks. After the user completes a particular assessment task within the context of the selected assessment environment, the user may click on the "Check Challenge" interface object 304 of the GUI. The system may then verify whether the assessment task was successfully completed. For example, where the assessment task resulted in the modification of database records, the system may verify that data and/or metadata associated with the database records has been updated correctly in accordance with the completed assessment task. The result of validation of the assessment task may be presented to the user, who may continue completing further assessment tasks.

Figure 4:
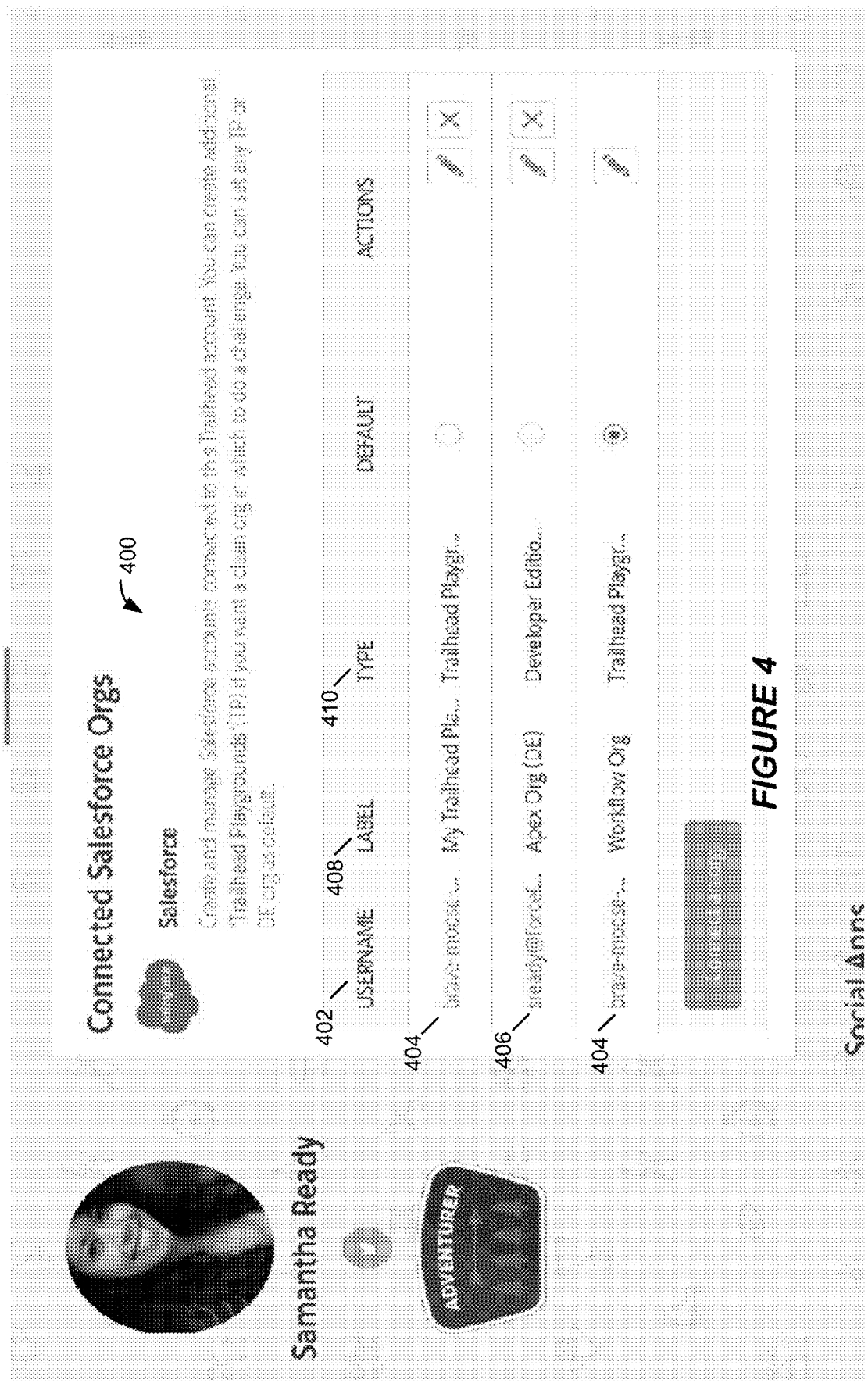
FIG. 4 shows an example of a GUI 400 presenting components for managing assessment environments, in accordance with some implementations.

FIG. 4 shows an example of a GUI 400 presenting components for managing assessment environments, in accordance with some implementations. As shown in this example, a user may manage their different user accounts using an assessment environment manager. For each assessment environment, the user may identify a corresponding user account (e.g. username) 402. A user may wish to have a single user account (e.g., username) associated with multiple assessment environments. Alternatively, a user may wish to use two or more user accounts in association with various assessment environments. In this example, the user has associated a first user account 404 with two different assessment environments, and a second user account 406 with a third assessment environment. Each assessment environment may have an associated label 408, which the user may update as desired. In some implementations, each assessment environment has an associated type 410. Each type 410 may have associated characteristics that enable the user to complete various different types of assessment tasks or access different types of data.

It is often desirable for a user to work in different assessment environments. For example, a user may fulfill multiple roles within a company, and may therefore wish to access different assessment environments for these different roles. By maintaining separate assessment environments, the user may ensure that data and metadata of one assessment environment does not conflict with the data and metadata of another assessment environment.

In accordance with various implementations, a user may declaratively switch between assessment environments. This may be accomplished without requiring the user to submit information pertaining to the assessment environments or associated credentials (e.g., passwords). More particularly, a user need not explicitly log out of an assessment environment that they wish to exit. Similarly, a user need not explicitly log in or submit credentials to switch to a different assessment environment. Since the user need not explicitly log in or out of assessment environments, the user may quickly switch contexts while accessing the eLearning platform.

Figure 5:
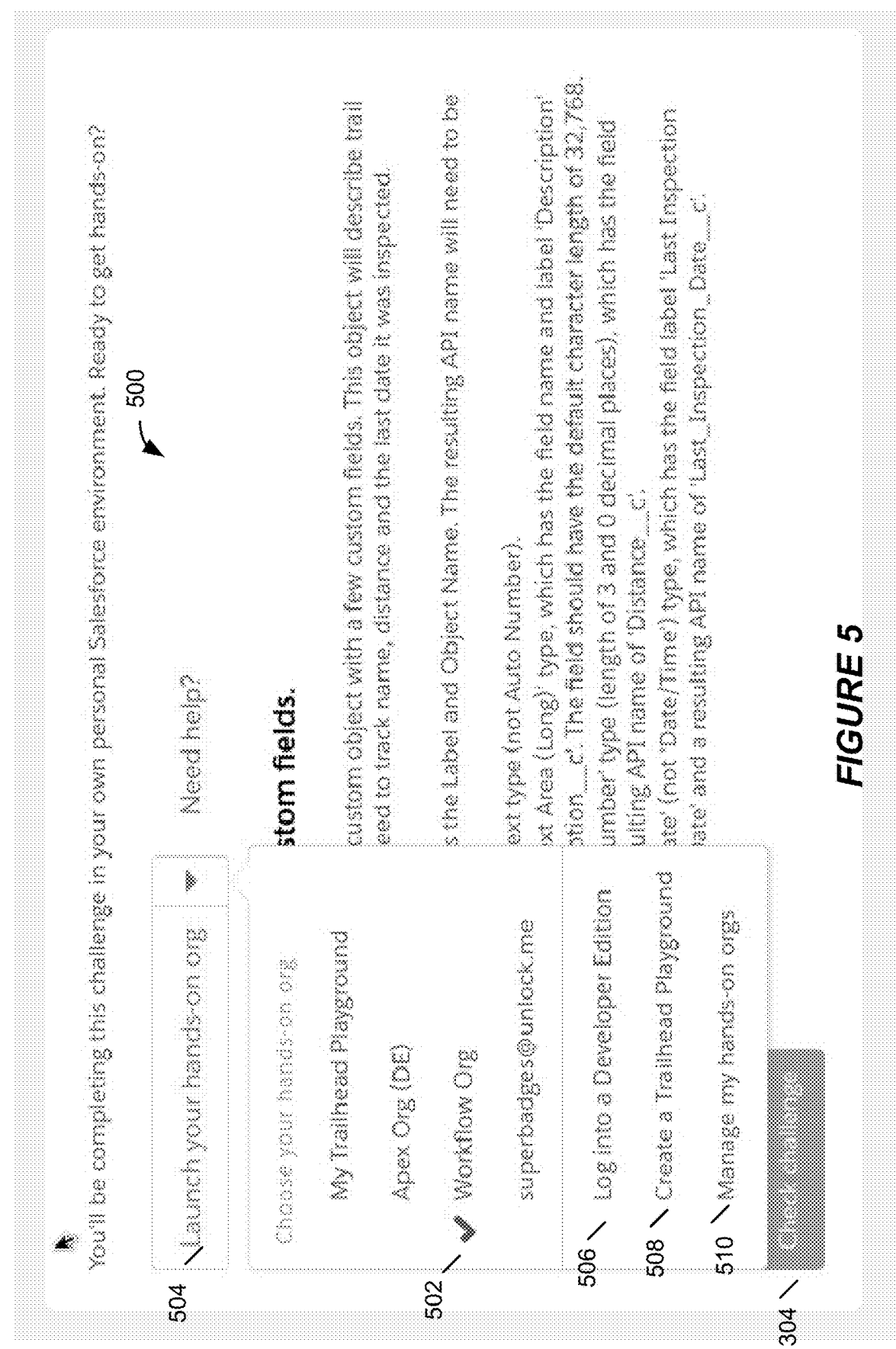
FIG. 5 shows an example of a GUI 500 presenting components for switching between assessment environments, in accordance with some implementations.

FIG. 5 shows an example of a GUI 500 presenting components for switching between assessment environments, in accordance with some implementations. As shown in this example, a list of user-selectable assessment environments may be presented to a user via a drop-down interface, menu, or other user interface. To launch one of the assessment environments, the user may select the desired assessment environment by moving their cursor to the desired assessment environment and clicking on the selected assessment environment. In this example, the user has selected "Workflow Org," as shown at 502. In this manner, the user may declaratively switch between different assessment environments. The user may launch the selected assessment environment by clicking on a button 504 or other user interface object.

The system launches the selected assessment environment without requiring the user to submit their credentials, such as a username or password. Rather, the system may automatically retrieve the user's credentials and log the user in to the selected assessment environment. For example, the system may log the user in to a particular Uniform Resource Locator (URL) associated with the selected assessment environment. After the system has logged the user in to the selected assessment environment, the user may complete assessment tasks within the context of the selected assessment environment.

In some instances, a user may wish to create their own assessment environment. More particularly, the user may specify or select a URL that they wish to associate with a particular assessment environment. In these instances, the user may log in to the assessment environment using their credentials at 506 and save the assessment environment for subsequent selection. The system may automatically save the user's credentials in association with the assessment environment for subsequent retrieval.

In accordance with various implementations, the user may request that a new assessment environment be system-generated. In this example, the user may select a "Create a Trailhead Playground" option 508 from a menu to initiate automated assessment environment generation. The system may generate a new assessment environment, which may subsequently be selected by the user for subsequent assessment tasks. Automated assessment environment generation will be described in further detail below with reference to FIG. 6.

In some implementations, the user may access the assessment environment manager by selecting a corresponding user interface object. In this example, the user has selected "Manage my hands-on orgs," as shown at 510. The user may then be presented a GUI such as that shown in FIG. 4, enabling the user to manage all of their assessment environments from a single user interface.

Figure 6:
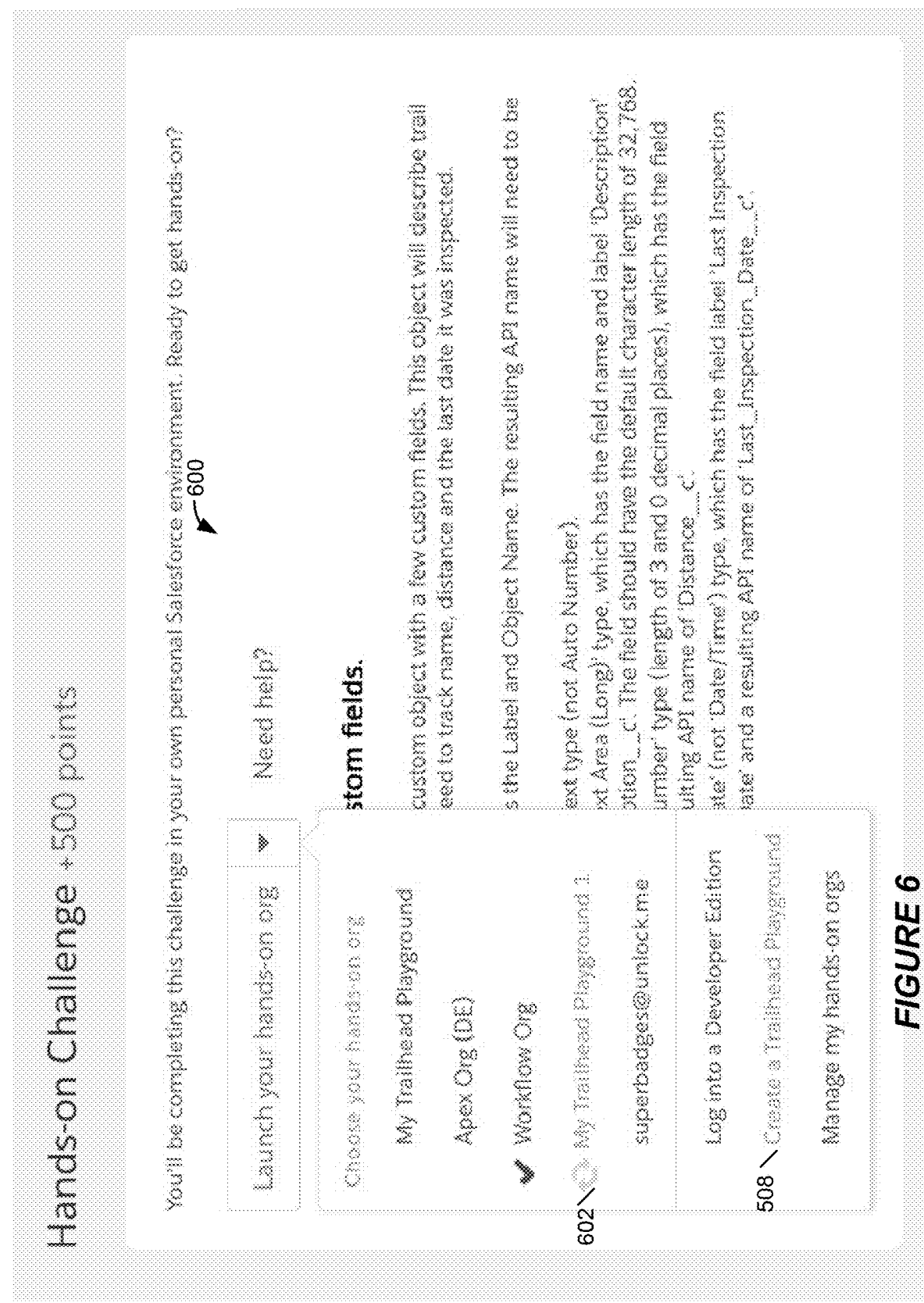
FIG. 6 shows an example of a GUI 600 presenting components for automatically generating assessment environments, in accordance with some implementations.

FIG. 6 shows an example of a GUI 600 presenting components for automatically generating assessment environments, in accordance with some implementations. Automated generation of an assessment environment may be initiated via a selection of the user of a menu option such as "Create a Trailhead Playground" option 508. After automated generation of an assessment environment is initiated, the system may present a visual indication that the assessment environment is being generated, as requested. In this example, an icon 602 signifies the spin out of the new assessment environment by the system.

The generation of the assessment environment may be performed automatically by the system. This is accomplished without requiring the user to submit information pertaining to the desired assessment environment. More particularly, the user need not specify a URL for the assessment environment. In addition, the user need not submit a username or password. Instead, the system may randomly generate a URL that it associates with the new assessment environment. The system may also automatically generate a username and password that the system will use to log the user in to the assessment environment upon selection of the assessment environment by the user. Generation of the URL, username, and/or password may be accomplished via a random name generator.

Figure 7A:
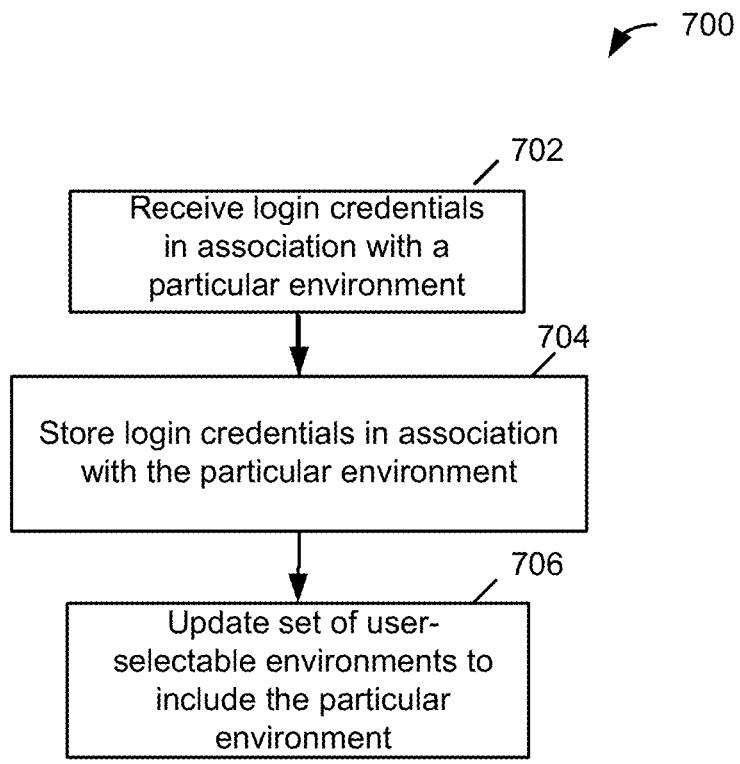
FIG. 7A shows an example of a method 700 for saving an assessment environment, in accordance with some implementations.

FIG. 7A shows an example of a method 700 for saving an assessment environment, in accordance with some implementations. An assessment environment may be saved automatically. For example, an assessment environment may be saved to a user's account at the time that the user logs in to the assessment environment. Alternatively, an assessment environment may be added to the user's account in response to a user request. For example, an assessment environment may be added to the user's account from a web page presented via an assessment environment manager.

A user may submit their login credentials at 702 in association with the assessment environment. For example, the user may submit the login credentials in association with a URL corresponding to the assessment environment. The system may then store the login credentials in association with the assessment environment at 704. Login credentials may include a username and password. In some implementations, credentials may include a refresh token that is unique to the assessment environment. In addition, the set of user-selectable assessment environments associated with the user account is updated to include the particular environment at 706. After the assessment environment has been added to their account, the user may declaratively switch to that assessment environment at a later time.

In accordance with some implementations, when the user declaratively switches to the assessment environment, the system retrieves a refresh token associated with the assessment environment. The refresh token may then be used to request an access token for accessing the assessment environment. In this manner, the system may automatically log the user in to the selected assessment environment.

Figure 7B:
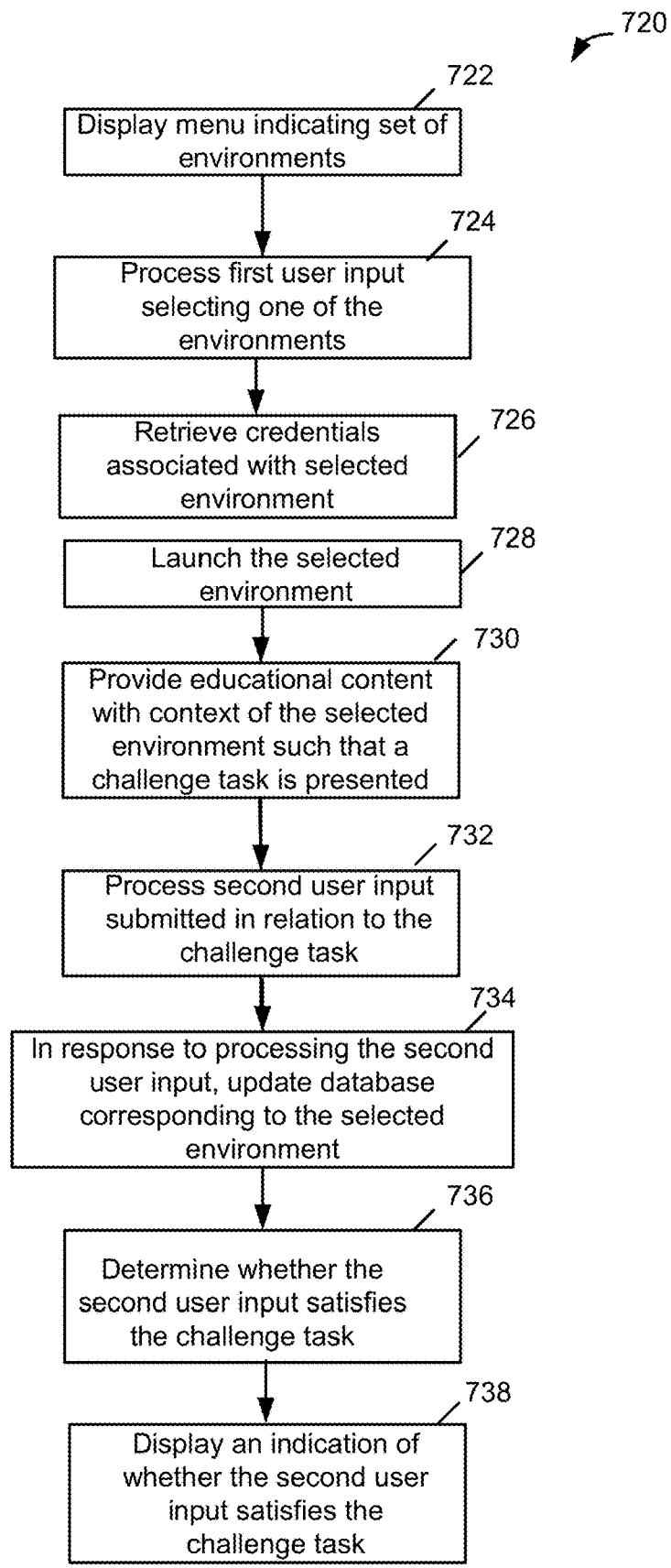
FIG. 7B shows an example of a method 720 for implementing an assessment environment switcher, in accordance with some implementations.

In accordance with various implementations, an assessment environment switcher enables a user to declaratively switch between previously authenticated environments. FIG. 7B shows an example of a method 720 for implementing an assessment environment switcher, in accordance with some implementations. To facilitate the switching between assessment environments, the system provides a user interface that enables a user to declaratively switch between assessment environments. In some implementations, the system displays, in a user interface on a display of a user device, a menu indicating a set of user-selectable environments at 722. Each of the environments may be associated with a corresponding Uniform Resource Locator (URL) and a corresponding database. In addition, each of the environments may be associated with a set of credentials of a user that has the authority to access the corresponding environment. For example, the credentials may include a username and password.

To switch between assessment environments, the user submits first user input selecting one of the environments. For example, the user may declaratively switch to an environment by simply pointing and clicking on a selected environment within a menu of selectable environments. The system processes the first user input submitted at the user device at 724. For example, where the user selects a particular assessment environment, the system may identify the selected assessment environment within a database or table of selectable assessment environments.

The system may retrieve the credentials associated the selected environment at 726. For example, the system may retrieve the username and password associated with the selected environment. In some implementations, the credentials include a refresh token that is associated with the environment.

The system may then launch the selected environment at 728 using the corresponding URL and credentials. For example, the system may automatically log the user in to the URL on the user's behalf using the user's credentials without requiring the user to submit their credentials.

The system may provide educational content within a context of the selected environment such that a challenge task is presented at 730. The system processes second user input submitted at the user device in relation to the challenge task at 732. In response to processing the second user input, the system may update the database corresponding to the selected one of the environments at 734. For example, completion of the challenge task may result in the updating of a record of the database.

The system may determine whether the second user input satisfies the challenge task based, at least in part, on data and metadata stored in the database corresponding to the selected environment at 736. For example, the system may determine whether the updates to the database are accurate in light of the challenge task that was recently completed. The system may then display, on the display of the user device, an indication of whether the second user input satisfies the challenge task at 738

If the user chooses to select a different environment, the system may automatically log the user out of the previously selected environment and launch the newly selected environment using the corresponding URL and credentials. Since the user need not submit their credentials each time they switch to a different assessment environment, the user may easily switch between assessment environments to complete challenge tasks presented by the eLearning platform.

In accordance with various implementations, the system may "spin-out" or generate new assessment environments with minimal user input. By automatically spinning-out a new assessment environment, this eliminates the need for users to complete the lengthy and laborious process that is typically required to create a new assessment environment.

Figure 7C:
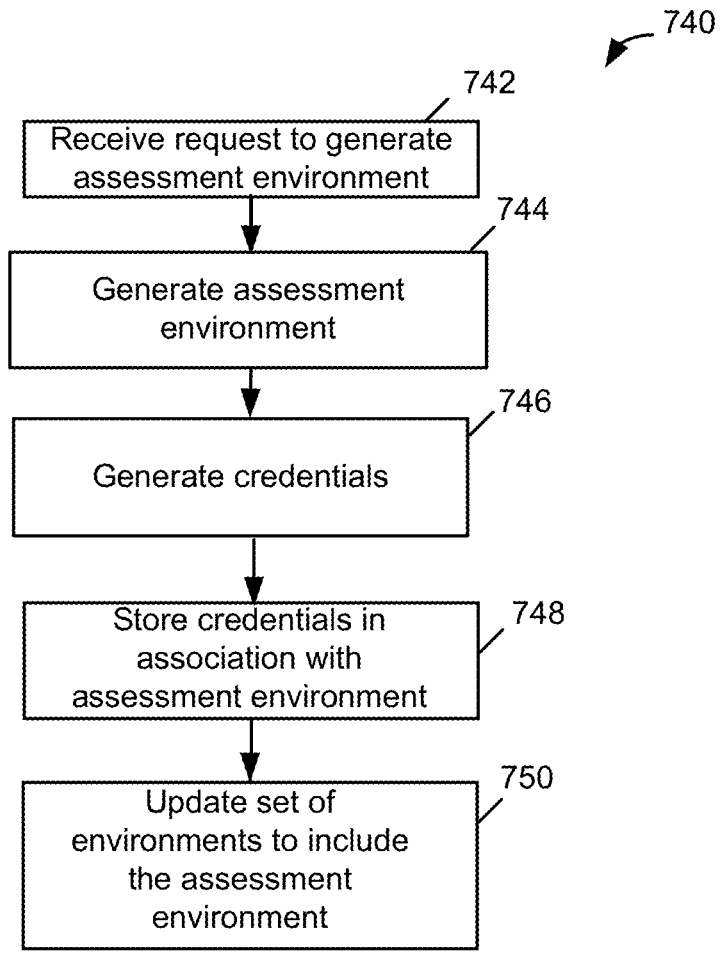
FIG. 7C shows an example of a method 740 for generating assessment environments, in accordance with some implementations.

FIG. 7C shows an example of a method 740 for generating assessment environments, in accordance with some implementations. A user may submit a request to generate an assessment environment at 742. For example, the user may select a "Create a Trailhead Playground" option from a menu. In response, the system may generate a new assessment environment without requesting further information such as a URL or credentials from the user. Thus, the time-consuming process of setting up an assessment environment that the user must typically complete has been offloaded to the system.

The system generates a new assessment environment at 744. More particularly, the system may generate a URL and associate the URL with the new assessment environment. In addition, the system may generate or identify a database and associate the database with the assessment environment. In accordance with some implementations, the URL and/or database may be generated through the use of a random name generator.

Since the user may modify objects within the database during the eLearning process, it is important that the user does not modify data that may be accessed by other users in the organization. Thus, the system may replicate objects stored in an organizational database associated with an organization in the database associated with the assessment environment.

In accordance with various implementations, the system may generate credentials at 746 that it will associate with the assessment environment. For example, the credentials may include a username and password. The credentials may be randomly generated, as described herein. In other implementations, the system may reuse credentials of the user account that are associated with a different assessment environment.

The system may store the login credentials in association with the new assessment environment at 748. In addition, the set of user-selectable environments associated with the user account may be updated to include the newly generated assessment environment. The user may thereafter declaratively switch to or from the assessment environment without completing an explicit login or logout process. Since the user need not submit credentials or other information, the user may quickly switch between environments with minimal effort.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
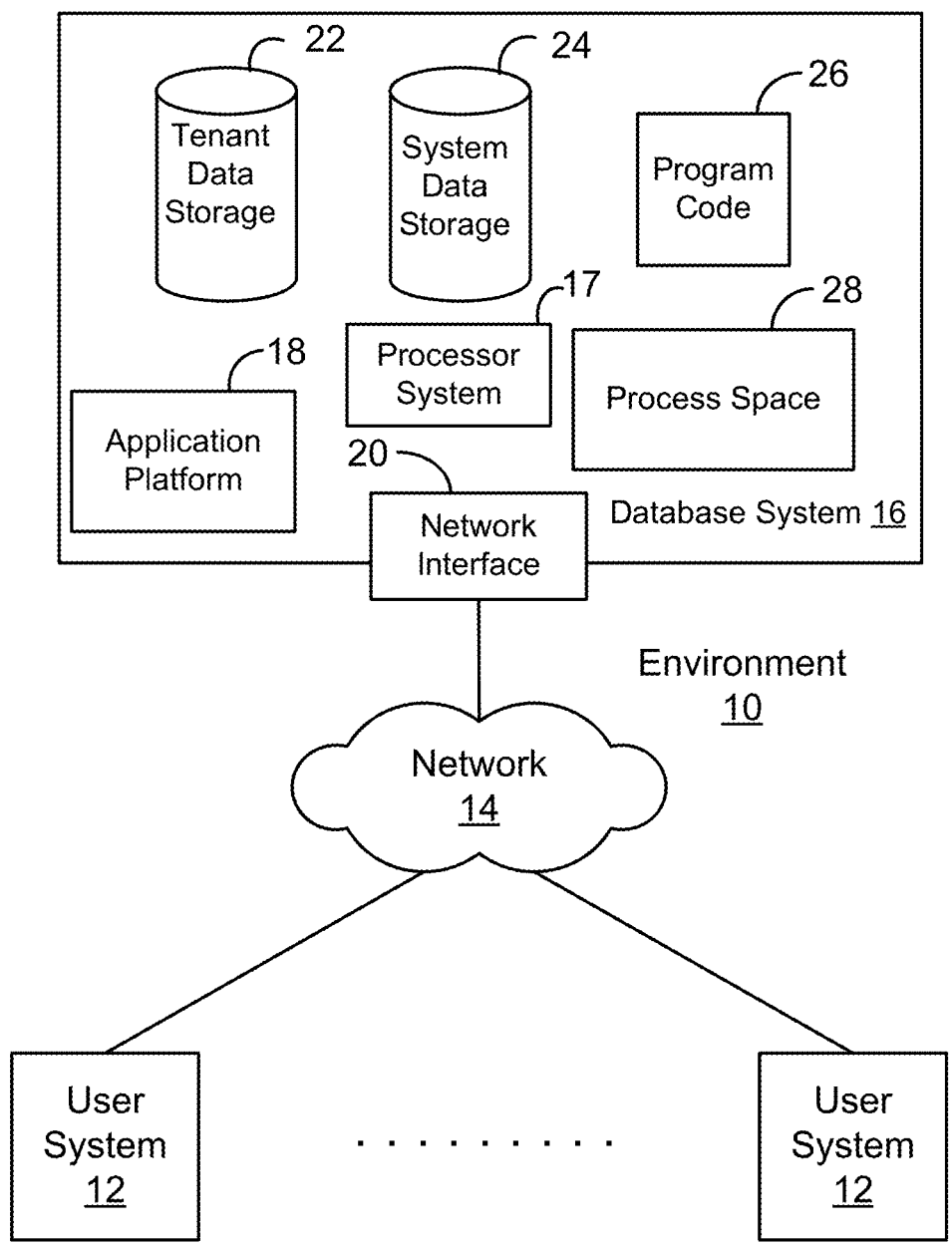
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
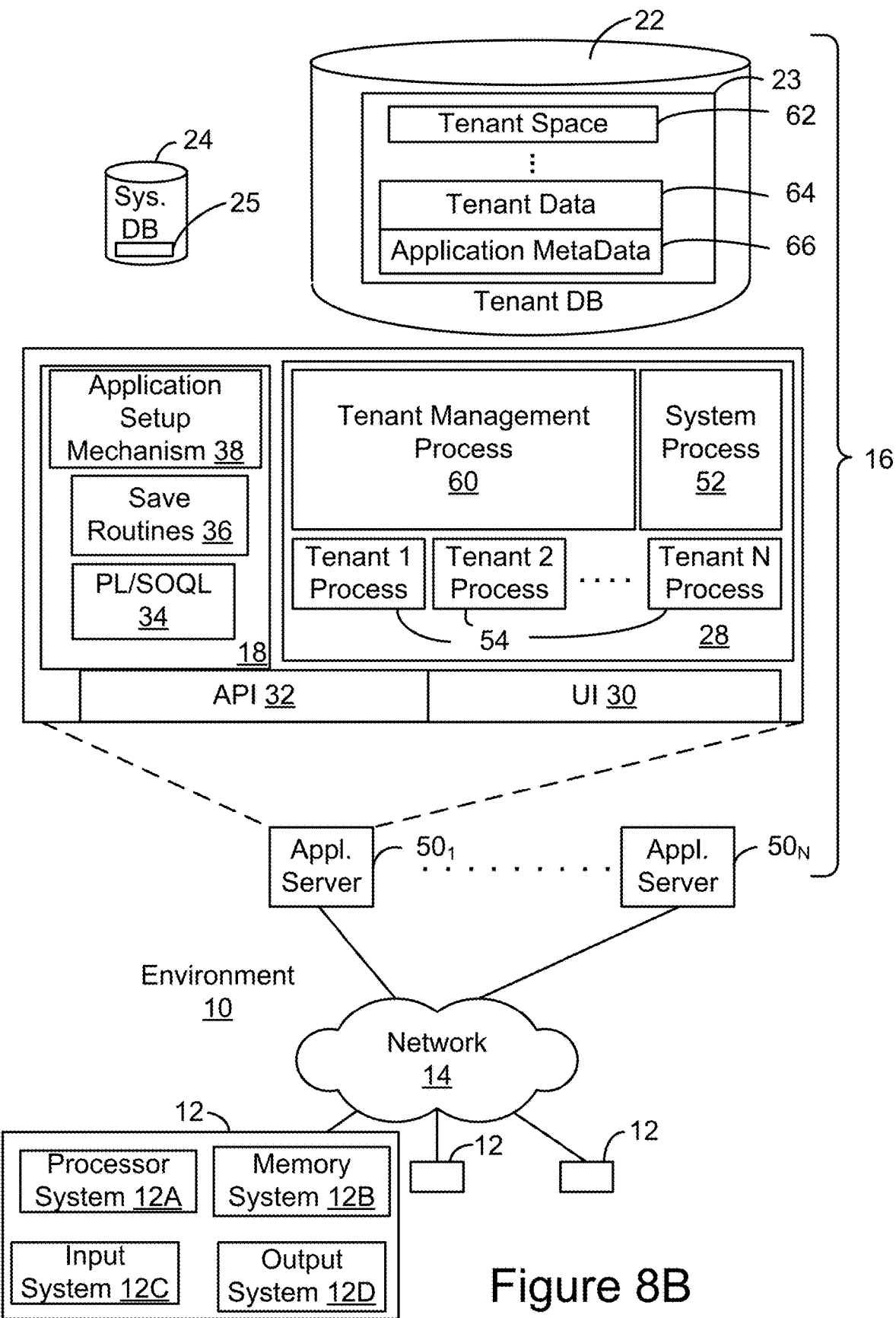
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server 50$_1$ might be coupled via the network 14 (e.g., the Internet), another application server 50$_{N-1}$ might be coupled via a direct network link, and another application server 50$_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
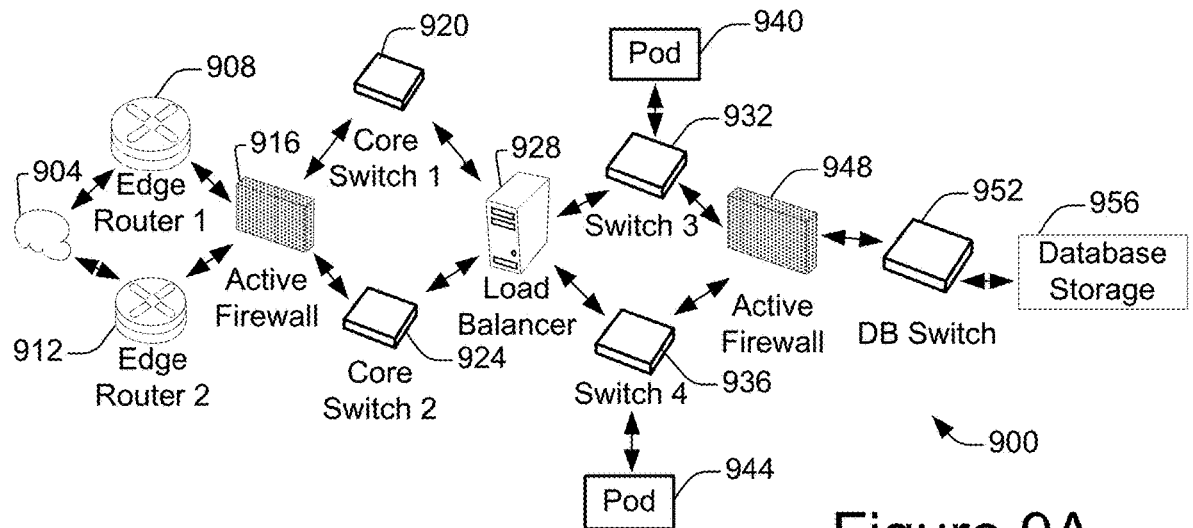
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

Figure 9B:
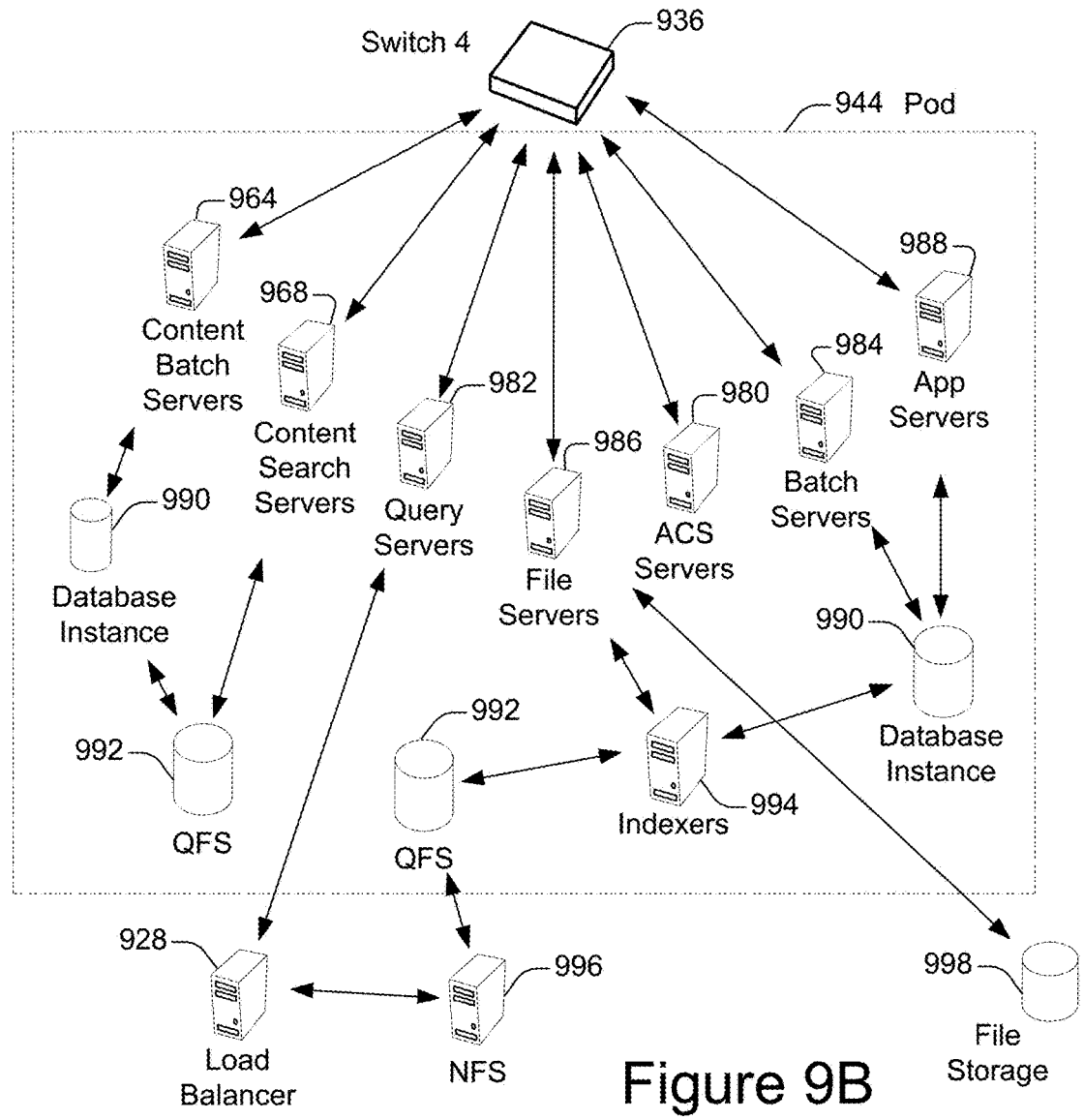
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising: a database system implemented using a server system, the database system comprising at least one database, the database system configurable to cause:

processing a user request to generate a learning assessment environment;

responsive to processing the user request, automatically generating a particular learning assessment environment such that the particular learning assessment environment is associated with a corresponding Uniform Resource Locator (URL), credentials of a user in association with the particular learning assessment environment, and a corresponding database;

updating a set of learning assessment environments accessible via a user account associated with the user to include the particular learning assessment environment, each of the learning assessment environments being associated with a corresponding URL, credentials of the user in association with the learning assessment environment, and a corresponding database;

providing, for presentation in a user interface on a display of a user device, a menu indicating the set of learning assessment environments;

processing first user input submitted at the user device, the first user input selecting one of the learning assessment environments;

retrieving, from the database of the database system, the credentials of the user associated with the selected one of the learning assessment environments;

launching the selected one of the learning assessment environments using the corresponding URL and credentials of the user, the credentials including a password or refresh token;

providing, within a context of the selected one of the learning assessment environments, a learning assessment task via the URL corresponding to the selected learning assessment environment for display at the user device;

processing second user input submitted at the user device in relation to the learning assessment task;

in response to processing the second user input, updating the database corresponding to the selected one of the learning assessment environments based, at least in part, on the second user input;

determining whether the second user input satisfies the learning assessment task by verifying that data and metadata stored in the database corresponding to the selected one of the learning assessment environments has been updated correctly for the learning assessment task;

providing, for presentation on the display of the user device, an indication of whether the second user input satisfies the learning assessment task; and tracking an accuracy with which a plurality of learning assessment tasks including the learning assessment task are completed by the user within a context of the selected one of the learning assessment environments based, at least in part, on whether the second user input satisfies the learning assessment task.

2. The system as recited in claim 1, the database system further configurable to cause:

processing third user input submitted at the user device, the third user input selecting a second one of the learning assessment environments;

retrieving, from the database of the database system, the credentials associated the selected second learning assessment environment; and launching the selected second learning assessment environment using the corresponding URL and credentials of the user in association with the selected second learning assessment environment.

3. The system as recited in claim 1, wherein the credentials of the user in association with the learning assessment environment comprise at least one of: a username, password, or refresh token.

4. The system as recited in claim 1, the database system further configurable to cause:

generating the credentials of the user for the particular learning assessment environment, the credentials of the user including a username and password.

5. The system as recited in claim 1, wherein the user request does not include the credentials of the user for the particular learning assessment environment.

6. The system as recited in claim 4, the database system further configurable to cause:
  replicating, in the database corresponding to the particular one of the learning assessment environments, objects stored in an organizational database associated with an organization.

7. The system as recited in claim 1, the database system further configurable to cause:
  processing credentials of the user received in association with a particular learning assessment environment, the particular learning assessment environment being associated with a corresponding URL and a corresponding database;
  storing the credentials of the user received in association with the particular learning assessment environment; and
  updating the set of learning assessment environments to include the particular learning assessment environment.

8. A computer program product comprising computer-readable program code capable of being executed by one or more processors when retrieved from a non-transitory computer-readable medium, the program code comprising instructions configurable to cause:
  processing a user request to generate a learning assessment environment;
  responsive to processing the user request, automatically generating a particular learning assessment environment such that the particular learning assessment environment is associated with a corresponding Uniform Resource Locator (URL), credentials of a user in association with the particular learning assessment environment, and a corresponding database;
  updating a set of learning assessment environments accessible via a user account associated with the user to include the particular learning assessment environment, each of the learning assessment environments being associated with a corresponding URL, credentials of the user in association with the learning assessment environment, and a corresponding database;
  providing, for presentation in a user interface on a display of a user device, a menu indicating the set of learning assessment environments;
  processing first user input submitted at the user device, the first user input selecting one of the learning assessment environments;
  retrieving, from the database of the database system, the credentials of the user associated with the selected one of the learning assessment environments;
  launching the selected one of the learning assessment environments using the corresponding URL and credentials of the user, the credentials including a password or refresh token;
  providing, within a context of the selected one of the learning assessment environments, a learning assessment task via the URL corresponding to the selected learning assessment environment for display at the user device;
  processing second user input submitted at the user device in relation to the learning assessment task;
  in response to processing the second user input, updating the database corresponding to the selected one of the learning assessment environments based, at least in part, on the second user input;
  determining whether the second user input satisfies the learning assessment task by verifying that data and metadata stored in the database corresponding to the selected one of the learning assessment environments has been updated correctly for the learning assessment task;
  providing, for presentation on the display of the user device, an indication of whether the second user input satisfies the learning assessment task; and
  tracking an accuracy with which a plurality of learning assessment tasks including the learning assessment task are completed by the user within a context of the selected one of the learning assessment environments based, at least in part, on whether the second user input satisfies the learning assessment task.

9. The computer program product as recited in claim 8, the program code comprising instructions further configured to cause:
  processing third user input submitted at the user device, the third user input selecting a second one of the learning assessment environments;
  retrieving, from the database of the database system, the credentials associated the selected second learning assessment environment; and
  launching the selected second learning assessment environment using the corresponding URL and credentials of the user in association with the selected second learning assessment environment.

10. The computer program product as recited in claim 8, wherein the credentials of the user in association with the learning assessment environment comprise at least one of: a username, password, or refresh token.

11. The computer program product as recited in claim 8, the program code comprising instructions further configured to cause:
  generating the credentials of the user for the particular learning assessment environment, the login credentials of the user including a username and password.

12. The computer program product as recited in claim 8, wherein the user request does not include the credentials of the user for the particular learning assessment environment.

13. The computer program product as recited in claim 11, the program code comprising instructions further configured to cause:
  replicating, in the database corresponding to the particular one of the learning assessment environments, objects stored in an organizational database associated with an organization.

14. The computer program product as recited in claim 8, the program code comprising instructions further configured to cause:
  processing credentials of the user received in association with a particular learning assessment environment, the particular learning assessment environment being associated with a corresponding URL and a corresponding database;
  storing the credentials of the user received in association with the particular learning assessment environment; and
  updating the set of learning assessment environments to include the particular learning assessment environment.

15. A method, comprising:
  processing a user request to generate a learning assessment environment;
  responsive to processing the user request, automatically generating a particular learning assessment environment such that the particular learning assessment environment is associated with a corresponding Uniform Resource Locator (URL), credentials of a user in association with the particular learning assessment environment, and a corresponding database;

updating a set of learning assessment environments accessible via a user account associated with the user to include the particular learning assessment environment, each of the learning assessment environments being associated with a corresponding URL, credentials of the user in association with the learning assessment environment, and a corresponding database;

providing, for presentation in a user interface on a display of a user device, a menu indicating the set of learning assessment environments;

processing first user input submitted at the user device, the first user input selecting one of the learning assessment environments;

retrieving, from the database of the database system, the credentials of the user associated with the selected one of the learning assessment environments;

launching the selected one of the learning assessment environments using the corresponding URL and credentials of the user, the credentials including a password or refresh token;

providing, within a context of the selected one of the learning assessment environments, a learning assessment task via the URL corresponding to the selected learning assessment environment for display at the user device;

processing second user input submitted at the user device in relation to the learning assessment task;

in response to processing the second user input, updating the database corresponding to the selected one of the learning assessment environments based, at least in part, on the second user input;

determining whether the second user input satisfies the learning assessment task by verifying that data and metadata stored in the database corresponding to the selected one of the learning assessment environments has been updated correctly for the learning assessment task;

providing, for presentation on the display of the user device, an indication of whether the second user input satisfies the learning assessment task; and tracking an accuracy with which a plurality of learning assessment tasks including the learning assessment task are completed by the user within a context of the selected one of the learning assessment environments based, at least in part, on whether the second user input satisfies the learning assessment task.

16. The method as recited in claim 15, further comprising:
processing third user input submitted at the user device, the third user input selecting a second one of the learning assessment environments;
retrieving, from the database of the database system, the credentials associated the selected second learning assessment environment; and
launching the selected second learning assessment environment using the corresponding URL and credentials of the user in association with the selected second learning assessment environment.

17. The method as recited in claim 15, wherein the credentials of the user in association with the learning assessment environment comprise at least one of: a username, password, or refresh token.

18. The method as recited in claim 15, further comprising:
generating the credentials of the user for the particular learning assessment environment, the credentials of the user including a username and password.

19. The method as recited in claim 18, further comprising:
wherein the user request does not include the credentials of the user for the particular learning assessment environment.

20. The method as recited in claim 15, further comprising:
processing credentials of the user received in association with a particular learning assessment environment, the particular learning assessment environment being associated with a corresponding URL and a corresponding database; and
storing the credentials of the user received in association with the particular learning assessment environment.

* * * * *

UNITED STATES PATENT AND TRADEMARK OFFICE
CERTIFICATE OF CORRECTION

PATENT NO. : 10,613,709 B2
APPLICATION NO. : 15/592987
DATED : April 7, 2020
INVENTOR(S) : Ready et al.

Page 1 of 1

It is certified that error appears in the above-identified patent and that said Letters Patent is hereby corrected as shown below:

In the Claims

Column 30, Claim 19, Line 28, remove "further comprising:"

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*